Dec. 19, 1939.   H. C. STAEHLE   2,184,007
TRANSPARENCY MOUNT
Filed Oct. 7, 1938

Inventor
Henry C. Staehle
By N. M. Perriss
J. Griffin Little
Attorneys

Patented Dec. 19, 1939

2,184,007

UNITED STATES PATENT OFFICE 2,184,007

TRANSPARENCY MOUNT

Henry C. Staehle, Rochester, N. Y., assignor to Eastman Kodak Company, Rochester, N. Y., a corporation of New Jersey Application October 7, 1938, Serial No. 233,884

7 Claims. (Cl. 88—26)

The present invention relates to a mount for transparencies adapted for use in projecting machines. This mount is in the form of a pair of overlapping flaps formed from a single strip of sheet material such, for example, as paper. The flaps are formed with registering apertures which frame the transparency in position between the flaps.

In many mounts of this class, the transparencies, which are usually the form of thin flexible photographic film, are securely held in position in the mount. As is well known to those in the art, such films expand when heated, and, if securely held, would tend to curl or buckle, thus throwing the image of the film out of the focal plane of the optical members of the projector, the disadvantages of which are well known. In addition, such mounts are usually received by the user in the open or unfolded position so that such user must not only properly position the transparency in, but must also assemble the mount.

One object of the invention is the provision of a mount of the class described which is completely assembled so that the user may easily and quickly insert the transparency in the mount and in registry with the apertures thereof.

Another object of the invention is the provision in such a mount of a member secured to the mount flaps for loosely positioning the transparency within the mount and in registry with the apertures formed therein.

A further object of the invention is the provision of such a mount of a strip of material inserted between the flaps of the mount and coated on both sides with adhesive influenced by heat to stick the flaps to the strip to maintain the mount parts in assembled relation.

A still further object of the invention is the provision of a suitably coated member arranged to be inserted between the mount flaps so that the coating engages one face of the adhesive coated strip to prevent one side of the flap from adhering to the strip to provide an opening through which the transparency may be inserted edge-wise between the flaps.

Yet another object of the invention is the provision of a mount which is simple in construction, ready for immediate use, and in which the various parts are securely retained in assembled relation.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
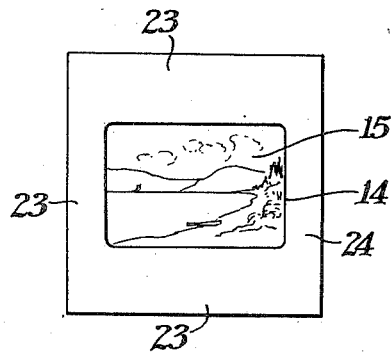
Fig. 1 is a view of a completely assembled mount constructed in accordance with the present invention, showing the transparency in position within the mount.
Figure 5:
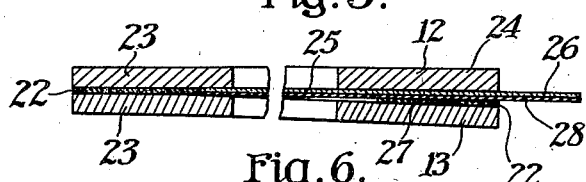
Fig. 5 is a sectional view through the completed mount as it is received by the user.
Figure 6:
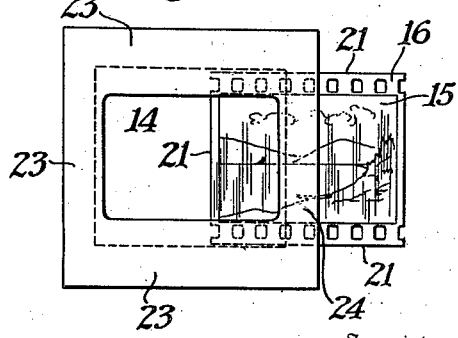
Fig. 6 is a view similar to Fig. 1, showing the method of inserting the transparency edgewise through the unsealed edge of the mount.

The transparency mount of the present invention is preferably formed from a single sheet or blank of strip material, such as paper, which is scored along the line 11 to provide a pair of frame members or flaps 12 and 13 each of which is provided with a viewing or light transmitting aperture 14 adapted to register with the aperture of the other flap when the mount is folded ready for use, as illustrated in Figs. 1, 5, and 6. The apertures 14 are of such size as to frame the image 15 of the transparency 16 which in the present instance is a strip of 35-mm. photographic film.

Figure 3:
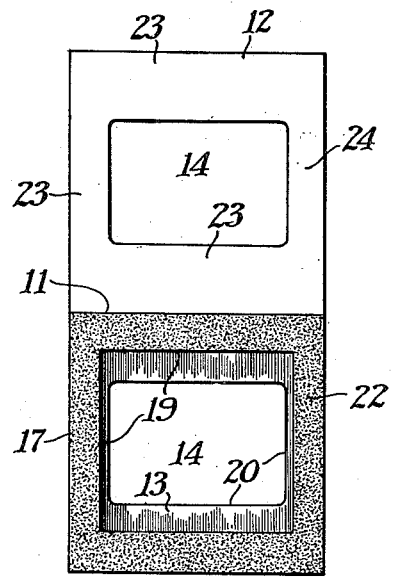
Fig. 3 is a view of the mount in the open or unfolded position, showing the relation thereto of the hollow rectangular sheet or strip of dry mounting tissue.
Figure 2:
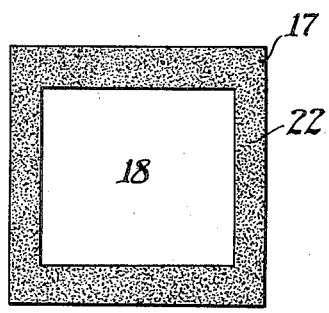
Fig. 2 is a view of a hollow rectangular strip of dry mounting tissue which is utilized not only to accurately position and maintain the transparency in registry with the viewing apertures in the mount, but also to stick the sides of the mount flaps together to retain the mount parts in assembled relation.

When the flaps 12 and 13 are folded on the line 11, the flaps are arranged in overlying relation, as shown in Fig. 5. However, prior to such folding, a hollow rectangular frame member 17 in the form of a sheet or strip of dry mounting tissue is placed on the flap 13 in a position shown in Fig. 3. This strip 17 is substantially the same size as the flap 13, as shown in Fig. 3, and is formed with a central opening 18, the edges 19 of which are spaced from the edges 20 of the aperture 14 as clearly shown in Fig. 3. The opening 18 is preferably of such a size as to loosely receive the transparency 16 when the latter is positioned between the flaps 12 and 13. The edges 19 engaging some of the marginal edges 21 of the transparency 16 to maintain the latter in registry with the apertures 14. The transparency is thus free to move slightly within the mount so as to eliminate any buckling or bending of the transparency when heated by the heat rays from the projecting lamp. The opening 18 thus affords a shallow seat in which the transparency 16 is loosely positioned.

As is well known, dry mounting tissue has both sides thereof coated with an adhesive 22 which softens under heat. By means of this arrangement, when the two flaps 12 and 13 are arranged in overlapping relation and heat is applied to the mount, the dry mounting tissue serves to stick or adhere the sides or marginal edges 23 of the two flaps together to hold the mount parts in assembled relation.

Figure 4:
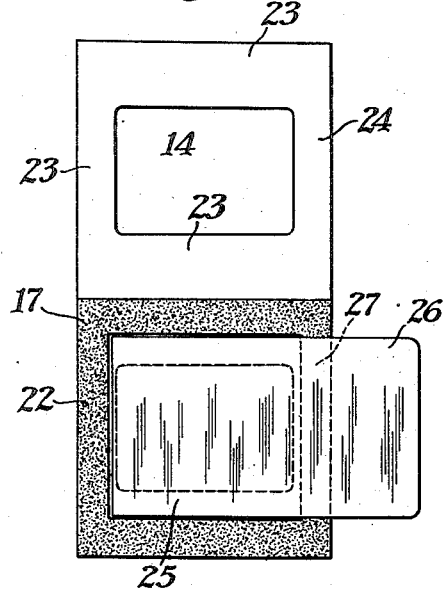
Fig. 4 is a view similar to Fig. 3, but showing the position of the gelatin coated paper strip for preventing the adherence of one side of one of the mount flaps to the mounting tissue so as to afford an opening through which the transparency may be inserted between the flaps of the mount.

However, in order to provide an opening in the mount for the insertion of the transparency 16, one side 24 of the flap 12 is not stuck or adhered to the mounting tissue 17. To secure this result, a strip of paper 25, or other suitable material, is positioned within the opening 18 of the strip 17 and is formed with an extension 26 which overlies the side 27 of the strip 17 and projects exteriorly of the mount, as shown in Figs. 4 and 5, for a purpose to be presently described.

The face of the strip 25 which engages the side 27 of the strip 17 is coated with a suitable adhesive resisting material 28, such as gelatin, so that the strip 25 will not adhere to the strip of dry mounting tissue 17. As the strip 25 is interposed between the dry mounting tissue and the side 24 of the flap 12, obviously the side 24 will not be secured, thus leaving an opening through which the transparency may be inserted as shown in Fig. 6. Thus all four sides of the flap 13 are secured to the adhesive strip 17 while only three sides of the flap 12 are secured thereto.

When a transparency is to be positioned within the mount, the extension 26 is gripped and the strip 25 is withdrawn from the mount. The transparency 16 may now be inserted edgewise between the flaps 12 and 13, as shown in Fig. 6, by reason of the unsecured side 24 of the flap 12. The transparency is then positioned in the opening 18 and the strip 17 so that the edges 19 may engage some of the edges 21 of the transparency to loosely maintain the latter in registry with the opening 14. After the transparency has been inserted, heat is applied to the edge 24 to stick the latter to the dry mounting tissue. Obviously this last edge may be left unsecured, if desired, so that the transparency may be removed from the mount and another transparency substituted therefor.

In assembling the mount, the strip 17 of dry mounting tissue is first placed on the flap 13, as shown in Fig. 3. The gelatin coated strip of paper 25 is then placed, as shown in Fig. 4, so that the face 28 of the strip 25 overlies the side 27 of the strip 17. The flap 12 is then folded to overlie the flap 13 and the mounting tissue. Heat is then applied to stick four sides of the flap 13 and three sides of the flap 12 to the mounting tissue. The mount thus assembled, as shown in Fig. 5, is the form in which it is received by the user. When a transparency is to be inserted in the mount, the strip 25 is first removed, the transparency is then inserted and the end 24 may be sealed as above described.

It is apparent from the above description that the present invention thus provides a mount in which the transparency is loosely yet securely held in registry with the viewing apertures formed in the retaining flaps. It is also apparent that the strip of dry mounting tissue not only serves to position the transparency but to also secure the mount parts in assembled relation.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. A mount for transparencies comprising a pair of frame members adapted to be arranged in overlying relation and formed with registering light projecting apertures, a strip of dry mounting tissue positioned between said frame members and formed with a central opening adapted to receive a transparency and to hold the latter in registry with said apertures, said opening being slightly larger than said transparency, to permit free movement thereof, an adhesive which softens under heat arranged on both faces of said strip to secure the sides of said frame members to said strip, and means for preventing one side of one of said frame members from adhering to said strip to provide an opening for inserting the transparency between said frame members.

2. A mount for transparencies comprising a pair of frame members adapted to be arranged in overlying relation and formed with registering light projecting apertures, a strip of dry mounting tissue positioned between said frame members and formed with a central opening adapted to receive a transparency and to hold the latter in registry with said apertures, said opening being slightly larger than said transparency to permit free movement thereof, said strip having both faces thereof coated with an adhesive which softens under heat for sticking the sides of the frame members together, and an adhesive resisting coated strip inserted in said opening and having a portion thereof arranged to overlie said strip to prevent the sticking of the latter to one side of one of said frame members to afford an opening through which the transparency may be inserted between the frame members.

3. A mount for transparencies comprising a pair of frame members adapted to be arranged in overlying relation and formed with registering light projecting apertures, a hollow rectangular strip of dry mounting tissue positioned between said frame members, said strip having a central opening adapted to receive a transparency and to loosely hold the latter in registry with said apertures, said strip having both faces thereof coated with an adhesive which softens under heat to stick the sides of said frame members together to maintain the frame members and strip in assembled relation, and a sheet of gelatin coated paper positioned in said opening and having a portion thereof overlying said strip so that said gelatine coating contacts said strip to prevent sticking of one side of one of said frame members to said strip, said sheet being removable to permit a transparency to be inserted edgewise between the frame members through the unsealed side.

4. A method of forming a transparency mount which comprises the forming of a pair of apertured frame members, placing on one of said frame members a strip of material both surfaces of which are coated with an adhesive, folding the frame members in overlying relation, sticking four sides of one frame member to said strip, sticking three sides of the other frame member to said strip, inserting a transparency between the frame members through the unsecured side of said other frame member, and then sticking the fourth side of said other flap to said strip.

5. A method of forming a transparency mount which comprises the forming from a single strip of material a pair of apertured frame members, placing on one of said frame members a hollow rectangular sheet of material both surfaces of which are coated with an adhesive which softens under heat, folding the frame members in overlying relation, inserting a strip of gelatin-coated paper between the frame members so that the gelatin coating contacts one surface of said sheet, applying heat to said mount to stick four sides of one frame member and three sides of the other frame member to said sheet, the gelatin coating preventing adherence of the fourth side of said other frame members to said sheet, withdrawing said strip from between said frame member, inserting a transparency through said unsealed fourth side and positioning said transparency in the central opening of said sheet and in registry with the apertures in said frame members, and applying heat to said fourth side to stick the latter to said sheet.

6. As an article of manufacture, a mount for transparencies comprising two frame members spaced apart, a third frame member holding the first two frame members in fixed relation throughout portions of three sides of the frame members through an adhesive connection around the three sides thereof, the fourth side of one frame member being coated with an adhesive material but not adhesively attached to the fourth side of one frame member but being attached to the fourth side of the other frame member, and a temporary sheet of material having an adhesive resisting coating lying between the adhesive coated frame and the adjacent frame whereby an opening may be retained between the frame members for inserting a transparency.

7. As an article of manufacture, a mount for transparencies comprising two frame members spaced apart, a third frame member holding the first two frame members in fixed relation throughout portions of three sides of the frame members through an adhesive connection around the three sides thereof, the fourth side of one frame member being coated with an adhesive material but not adhesively attached to the fourth side of one member but being attached to the fourth side of the other frame member, and a temporary sheet of material having an adhesive resisting coating lying between the adhesive coated frame and the adjacent frame whereby an opening may be retained between the frame members for inserting a transparency.

HENRY C. STAEHLE.